Aug. 7, 1934.                L. WAINWRIGHT                1,968,977
                      TELEVISION METHOD AND APPARATUS
                          Filed Jan. 13, 1931        11 Sheets-Sheet 1
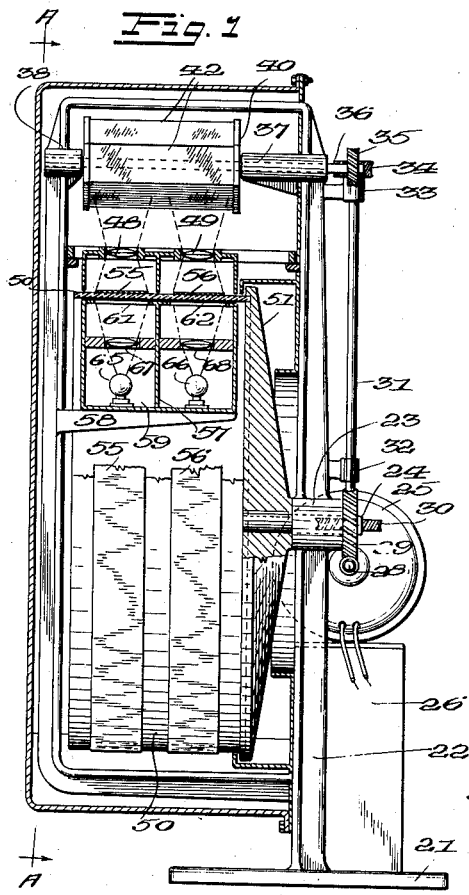
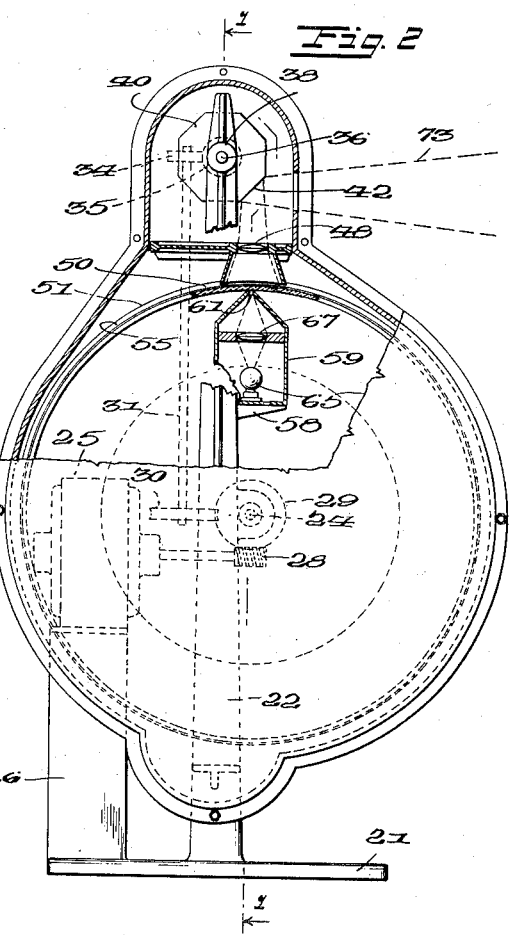
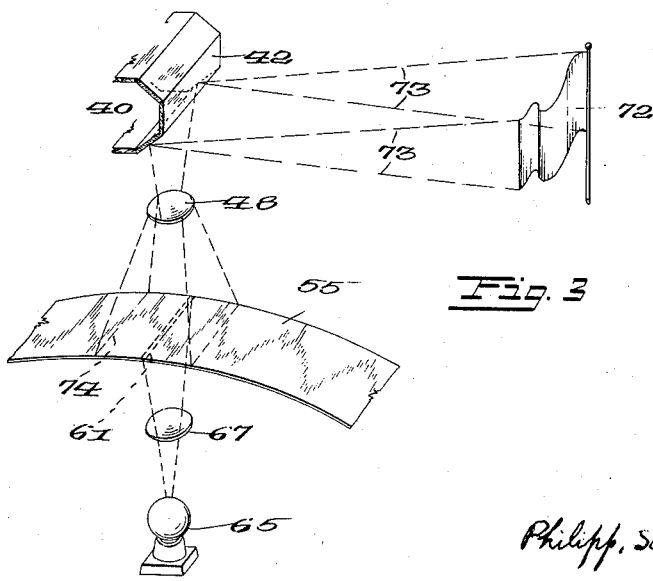
INVENTOR
Lawrence Wainwright,
BY
Philipp, Sawyer, Rice & Kennedy
ATTORNEYS Aug. 7, 1934.      L. WAINWRIGHT      1,968,977
TELEVISION METHOD AND APPARATUS
Filed Jan. 13, 1931      11 Sheets-Sheet 2
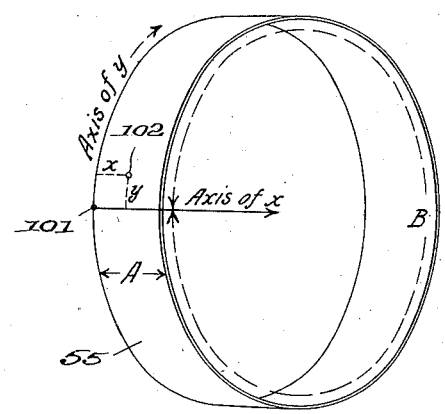
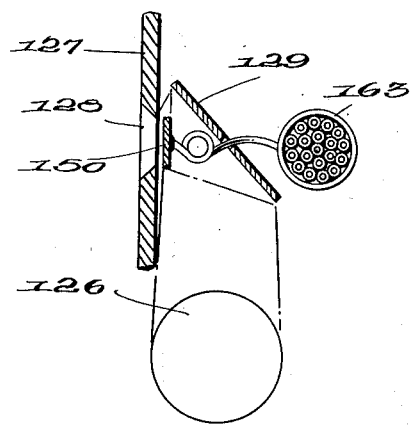
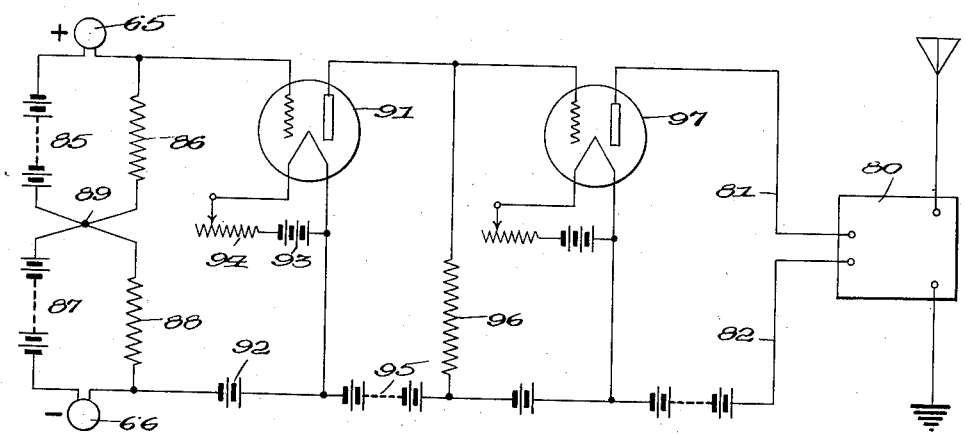
INVENTOR
*Lawrence Wainwright,*
BY
*Philipp, Sawyer, Rice & Kennedy*
ATTORNEYS

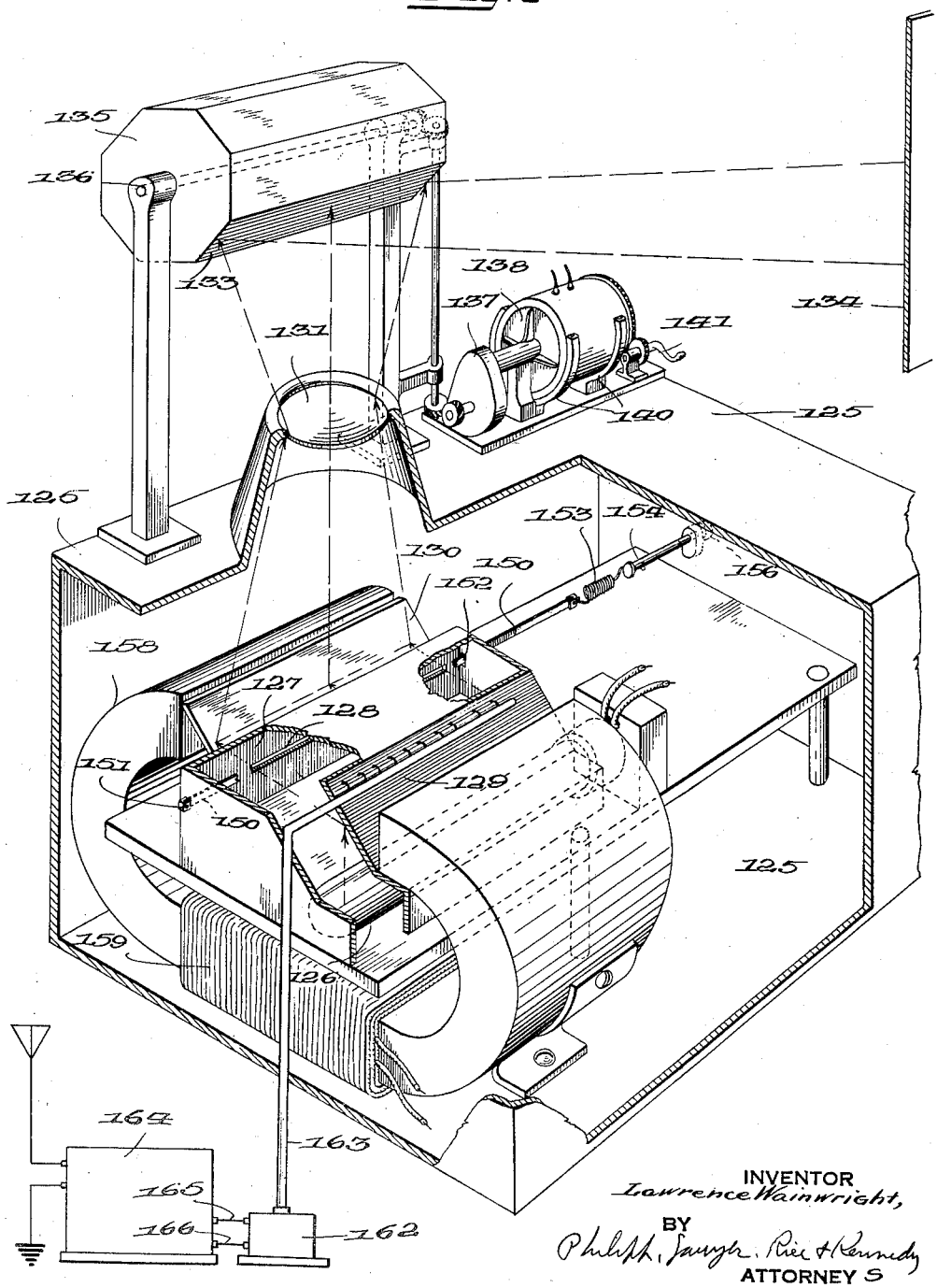

Aug. 7, 1934.    L. WAINWRIGHT    1,968,977
TELEVISION METHOD AND APPARATUS
Filed Jan. 13, 1931    11 Sheets-Sheet 5
Fig.6c.
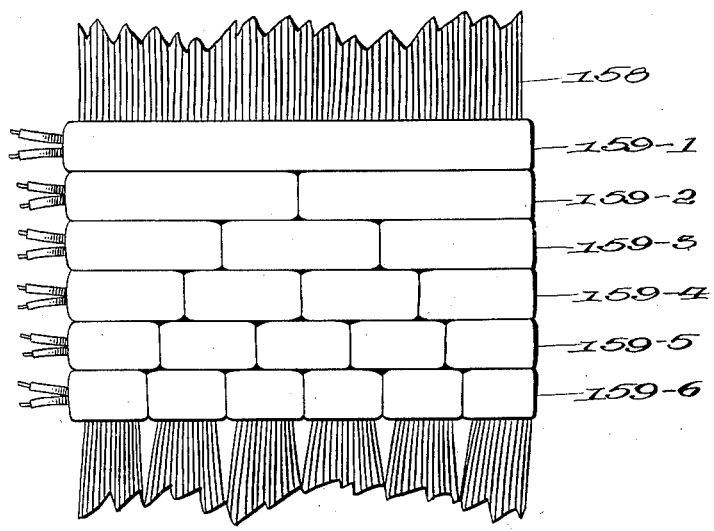
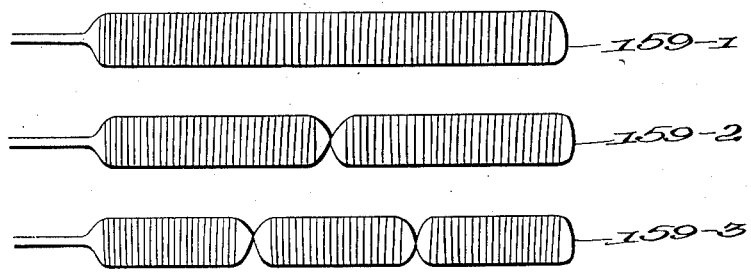
Fig.6d.
Inventor
Lawrence Wainwright,
By Philipp, Sawyer, Rice & Kennedy
Attorney Aug. 7, 1934. L. WAINWRIGHT 1,968,977
TELEVISION METHOD AND APPARATUS
Filed Jan. 13, 1931   11 Sheets-Sheet 6
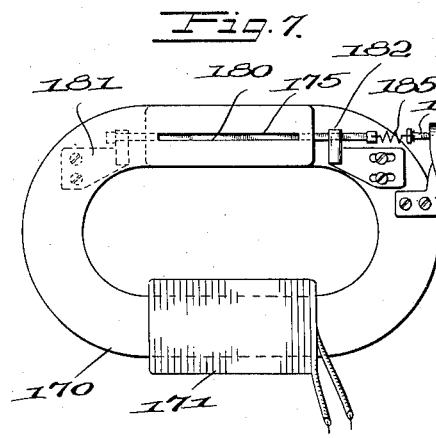
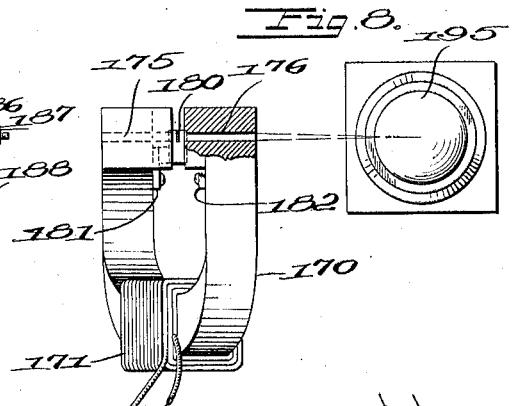
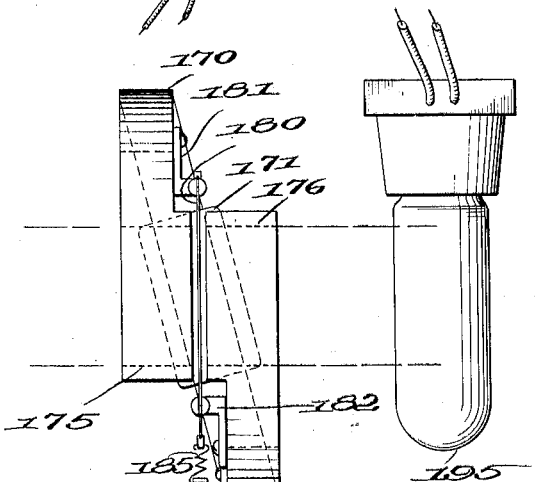
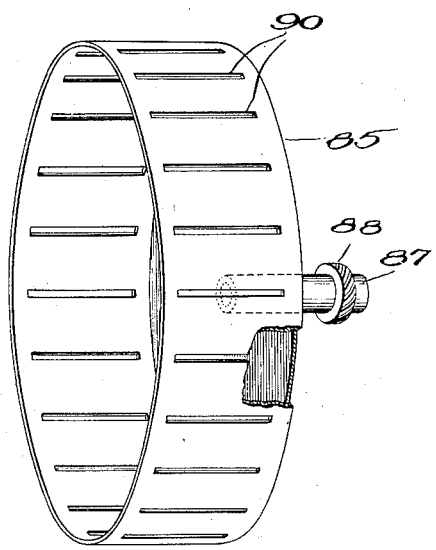
INVENTOR
Lawrence Wainwright
BY
ATTORNEYS

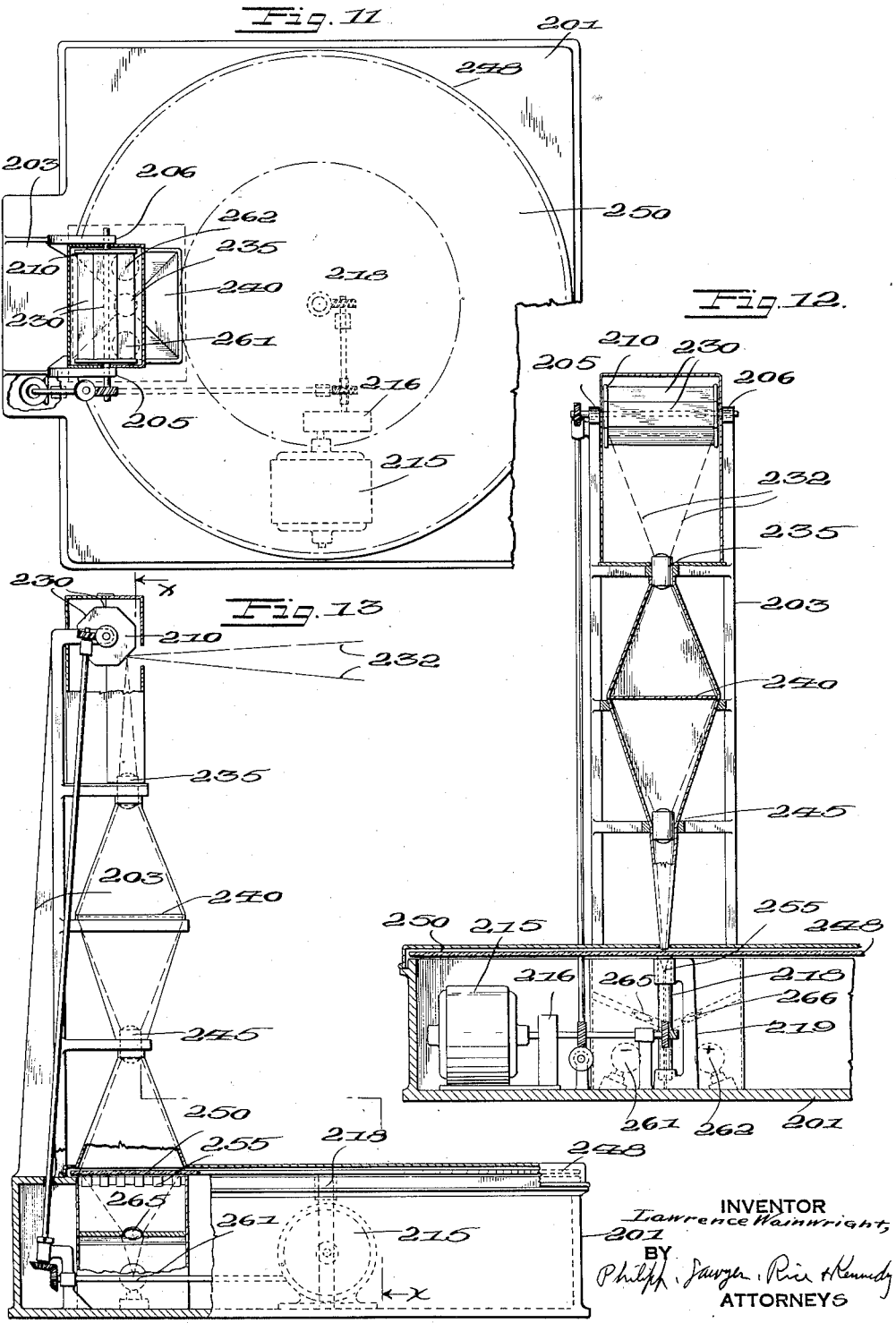

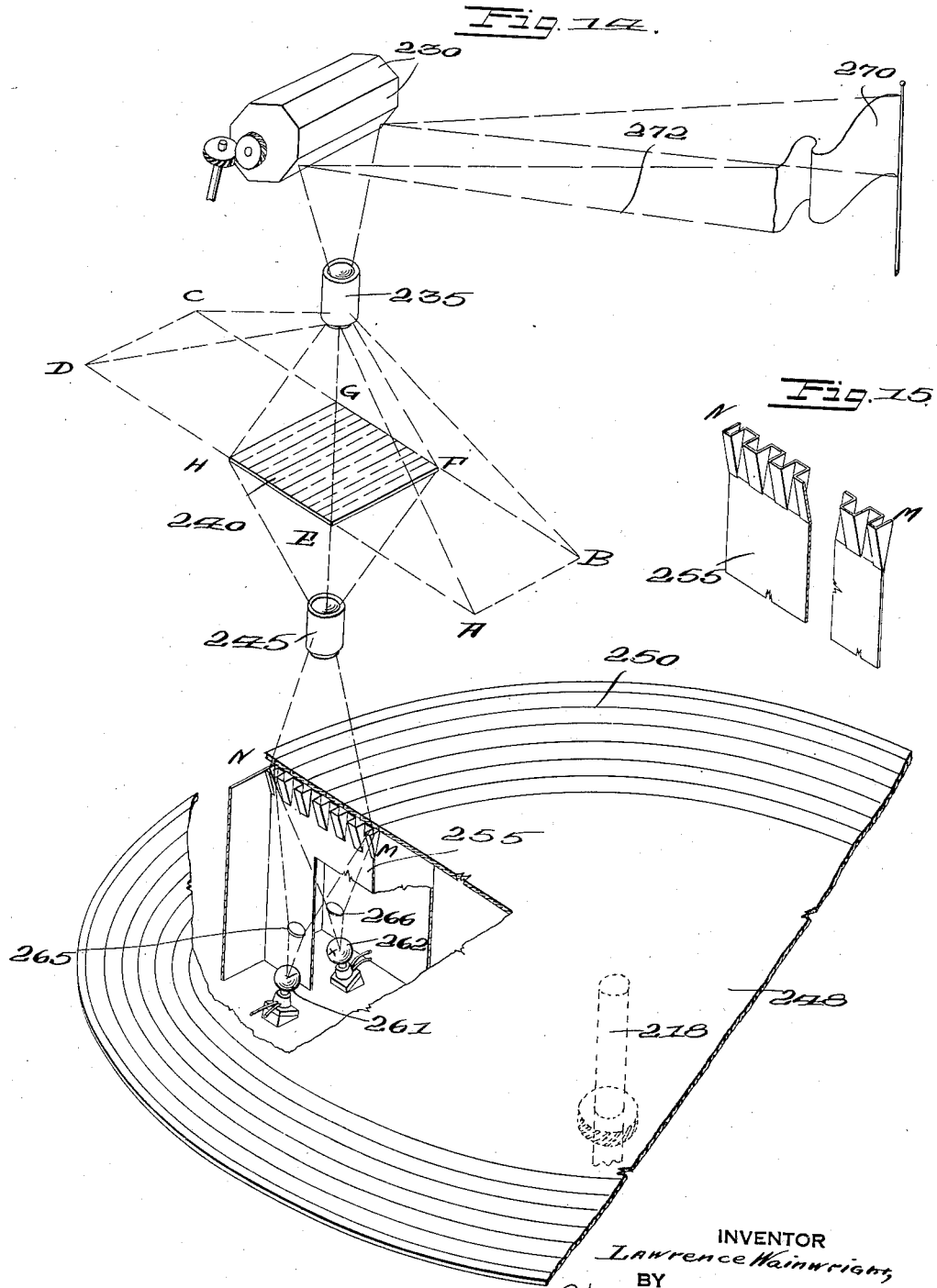

Aug. 7, 1934.  L. WAINWRIGHT  1,968,977
TELEVISION METHOD AND APPARATUS
Filed Jan. 13, 1931   11 Sheets-Sheet 9

INVENTOR
Lawrence Wainwright,
BY
ATTORNEY

Aug. 7, 1934.  L. WAINWRIGHT  1,968,977
TELEVISION METHOD AND APPARATUS
Filed Jan. 13, 1931  11 Sheets-Sheet 11

INVENTOR
Lawrence Wainwright,
BY
Philipp, Sawyer, Rice & Kennedy
ATTORNEYS

Patented Aug. 7, 1934

1,968,977

UNITED STATES PATENT OFFICE 1,968,977

TELEVISION METHOD AND APPARATUS

Lawrence Wainwright, Brooklyn, N. Y.

Application January 13, 1931, Serial No. 508,443

6 Claims. (Cl. 178—6)

This invention relates to a television method and apparatus for the transmission of visual images from one place to another, the images transmitted being those of moving or stationary objects.

According to the method of the invention, the image is transmitted line by line as distinguished from point by point, the line scanning the view or image repeatedly and with such rapidity that the eye has the impression of a complete and continuously seen image.

A line of the view or image is transmitted by instantaneously resolving the varying illumination along its length into a number of harmonic components, all of which are transmitted simultaneously and are recombined at the receiver's station so as to reproduce with sufficient accuracy an illuminated line whose illumination along its length varies substantially identically as the scanning line of the original view or image. The harmonic components are transmitted electrically, being converted into components of an oscillating electric current.

The actual transmission of the image through space can be accomplished in several ways, as will appear more fully hereinafter, such as a radio sending device and received on a radio receiver of known construction, or by wire by known apparatus, or by vibrations in any medium, e. g. water or air, between stations; and the novel apparatus of the invention consists of the mechanism for obtaining the harmonic components of the line at the sending station and converting them into harmonic components of an oscillating electric current, and, at the receiving station, in the mechanism for converting the harmonic components of the oscillating electric current into a reproduction of the original line.

In the forms of apparatus shown in the drawings and embodying the present invention, the converting apparatus at the sending station comprises means for scanning line by line the object prises means for scanning line by line the object whose image is to be transmitted so that a line at a time will be presented to the sending apparatus; and means for presenting to the sending apparatus a predetermined number of the harmonic components of that line simultaneously. It will be understood that there is an indefinite number of harmonic components of the line to be transmitted, and the predetermined number above referred to depends upon the greatest number of harmonic components which can be transmitted to give sufficient accuracy within the limits of practical economic construction.

Each form of receiving apparatus comprises means for producing an illuminated strip whose illumination varies substantially identically with that of the illuminated strip sent to the transmitter; a screen or area to receive the reproduction, and of means for sweeping the illuminated strip across that screen or area to reproduce the original image, and with sufficient rapidity to reproduce moving pictures or objects in action.

In one preferred form of the invention, only two photo-electric cells need be used; in another form, a larger number of cells is employed.

Several forms of apparatus are capable of carrying out the method of the present invention; and, by way of example, several forms of apparatus at the sending station and several forms at the receiving station are shown by way of illustration in the accompanying drawings. It is to be understood that the constructions may be varied in many respects without departing from the invention itself as defined by the appended claims.

In the drawings:

Fig. 1 is an elevation partly in section taken on the line 1—1 of Fig. 2, and showing the converting apparatus at the sending station which includes both the scanning means and the means for presenting the harmonic components to the sending apparatus;

Fig. 2 is a side elevation partly in section of the apparatus of Fig. 1 viewed in the direction of the arrows A, A;

Fig. 3 is a diagrammatic perspective view illustrating a portion of the optical path through the converting apparatus of Fig. 1;

Fig. 4 is a diagrammatic perspective view illustrating the shape of a part of the analyzing screen of the converting apparatus which is itself part of the means for impressing upon the transmitting apparatus energy oscillations corresponding to the harmonic components of the illuminated strip, showing the manner of constructing the screen according to Formula I hereinafter referred to;

Fig. 5 is a wiring diagram of the electrical connections at the sending station between the photo-electric cells and the transmitting apparatus;

Fig. 6 is a perspective view, including a wiring diagram, of the converting apparatus at the receiver's station for producing the illuminated strip and sweeping it across the screen or area upon which the reproduced image is projected;

Fig. 6B is a sectional view illustrating a method of connecting the wires of cable 163 to ribbon 150;

Fig. 6C is a fragmentary view of magnet 158 showing a modified form of winding;

Fig. 6D shows schematic sections of Fig. 6C.

Fig. 7 is a side elevation;

Fig. 8 is an end elevation, partly in section; and

Fig. 9 is a top elevation of apparatus to be substituted for part of that shown in Fig. 6.

Fig. 10 shows a modification of the converting apparatus at the transmitting station;

Fig. 11 is a top plan with cover removed;

Fig. 12 is a sectional view, section along line XX of Fig. 13 looking in the direction of arrows XX;

Fig. 13 is a side elevation with parts broken away;

Fig. 14 is a perspective view showing diagrammatically the general principles of the device;

Fig. 15 is an enlarged perspective fragmentary view of the separator 255;

Figure 6A:
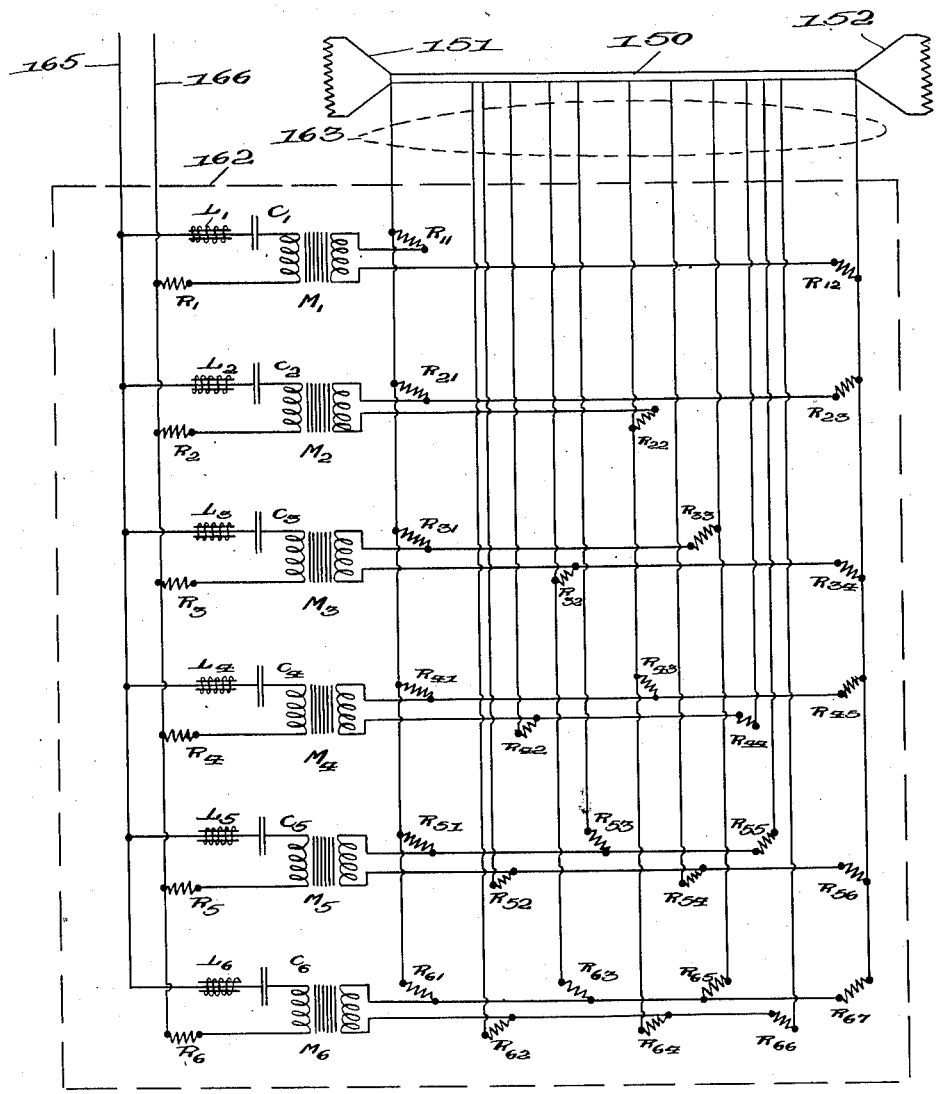
Fig. 6A is a schematic diagram of the distributer 162.

Referring in detail to the accompanying drawings, and particularly to Figs. 1 to 5 inclusive, a base 21 carries a vertical bracket 22 provided with a main shaft bearing 23, in which is rotatably mounted a main shaft 24, which is driven by a motor 25 mounted on a support 26, also carried by the base 21. Suitable reduction gearing 28 may be interposed between the motor 25 and shaft 24.

The main shaft 24 has fixed thereon a worm gear 29 which meshes with a worm 30 fixed on the lower end of a vertical shaft 31 rotatably mounted in vertically aligned bearings 32 and 33 in bracket 22. The upper end of the vertical shaft 31 has fixed thereon a worm 34 which meshes with a worm gear 35 fixed on a horizontal mirror shaft 36 rotatably mounted in aligned bearings 37 and 38 formed in or carried by the bracket 22.

The mirror shaft 36 carries a mirror drum 40 of equiangular polygonal cross section, each face of which carries a rectangular mirror 42. The number of mirrors 42, corresponding to the number of sides of the mirror drum 40, may be varied as desired, though the greater the number of mirrors, the lower the speed required of the rotatable mirror shaft 36. In the present instance, eight mirrors 42 are shown.

Supported below the mirror drum 40 are two image forming lenses 48 and 49, arranged side by side with their optical axes, in the present construction, vertical and parallel. The lenses 48 and 49 are arranged as close together as convenient, their purpose being to form two images substantially identical, though these images will differ slightly due to stereoscopic effect. However, as is well known in the optical art (as for instance in the check-sights used on naval guns), two absolutely identical images may be formed by using a single lens and a thinly silvered mirror or prism to divide the image into two duplicate parts.

The two identical, or substantially identical, images are focused side by side on the periphery of a thin, rotatable, cylindrical, translucent drum 50, carried by a disc 51 concentrically fixed on the horizontal rotatable main shaft 24. The purpose of the drum 50 is to carry the two parts, positive and negative, of the analyzing screen hereinafter described. The analyzing screen carrier could be a disc, as hereinafter described in connection with another embodiment of the invention.

The positive and negative portions 55 and 56 respectively of the analyzing screen are herein shown in the form of bands of varying optical density, and arranged side by side on the periphery of the carrier drum 50. The manner in which the optical density of the two portions of the analyzing screen varies will be hereinafter described. The two optical images are focused one on the positive portion 55 of the analyzing screen and the other on the negative portion 56 thereof.

A housing 59 rests on a support 58 carried by bracket 22 within the drum 50, and is light-tight except for two aligned slits 61 and 62 arranged parallel to the drum axis and closely adjacent the inner periphery of the drum 50. Through one of the slits 61 the light passing the positive portion 55 of the analyzing screen enters the housing 59, and through the other slit 62 the light passing the negative portion 56 of the analyzing screen enters said housing.

The housing 59 is divided by a vertical central partition 57 into two parts, one for the light passing through the positive portion 55 of the analyzing screen and the other for the light passing through the negative portion 56 thereof. In each half of the housing 59 is a photoelectric cell, 65 and 66, upon each of which is collected light passing to it through its housing slit. It is not essential that all the light passing through the housing slits 61 and 62 be collected on their respective photo-electric cells 65 and 66, but it is essential that the same proportion of light from each point on the positive and negative parts of the analyzing screen through which light passes be collected on their photoelectric cells; in other words, each point of the analyzing screen at any moment opposite its slit must be represented to the same proportionate extent on its photo-electric cell.

In the present form of the invention, lenses 67 and 68 are mounted one in each half of the housing 59, between the slit and the photo-electric cell, to focus on the cells 65 and 66 the light passing through the respective slits 61 and 62. The purpose of this construction is to insure that the two cells 65 and 66 are responsive to the same proportionate extent to the total amount of light passing through the slits 61 and 62 respectively.

The electric circuit of which the two photoelectric cells 65 and 66 form a part is connected to a transmitting device, such, for example, as a radio transmitter, so as to modulate the output of such transmitter, as will be hereinafter more fully described in connection with the wiring diagram of Fig. 5.

Referring now particularly to Fig. 3 for the purpose of tracing the path of light from the original object to the photo-electric cells, the numeral 72 designates an object the image of which is to be transmitted, such as a waving flag, or a photographic film, or a projection thereof on a screen. Light reflected from or transmitted through the object or film reaches one of the mirrors 42, as indicated by the dotted lines 73, and is reflected by the mirror to the image lenses 48 and 49. The path of the reflected light passing through each of these image lenses is the same, and hence its path through only one of these lenses is shown in Fig. 3 and will be described.

The image lens 48 forms an image outlined by the broken rectangle 74 on the cylindrical analyzing screen band 55, and a portion of that image, as modified by the varying density of said screen (which is hereinafter described) enters the slit 61 and is directed on the photo-electric cell 65 by the lens 67.

As the mirror drum 40 rotates, the portion of the image which enters the slit changes continuously, so that in a predetermined time interval the entire image has passed across the slit. In effect, therefore, the slit 61 scans the object a line at a time. The apparatus is so proportioned that as one mirror completes the passage of one image across the slit, the succeeding mirror begins to repeat the operation. During this transit the drum 50 rotates so that the analyzing screen passes several cycles by the slits.

Referring now to the wiring diagram of Fig. 5, a radio transmitter has been selected as one convenient form of means for transmitting the image to the receiver's station. The reference numeral 80 indicates diagrammatically a conventional radio transmitter, and the leads 81 and 82 carry the current which controls the modulation of the carrier wave sent out by the transmitter. In the ordinary transmission of sound, these leads 81 and 82 would lead to the transmitter from a microphone. In the present instance, however, the leads 81 and 82 lead to the transmitter from the circuits which include the photo-electric cells 65 and 66.

The essential purpose of the circuit shown in Fig. 5 is to cause the oscillating component of the current flowing in leads 81 and 82 to be proportional to the difference between the total amount of light falling on one of the photo-electric cells 65 and the total amount of light falling on the other photo-electric cell 66. The photo-electric cells 65 and 66 are connected in the circuit so that when the amount of light falling on the positive cell 65 exceeds the amount of light falling on the negative cell 66, the steady component of current in the leads 81 and 82 will be increased (or decreased); and when the amount of light falling on the negative cell 66 exceeds the amount of light falling on the positive cell 65, the steady component of current in the leads 81 and 82 will be decreased (or increased). But when the amount of light falling on the positive cell 65 is the same as that falling on the negative cell 66, the steady component of current in the leads 81 and 82 will be unaltered.

The foregoing results are accomplished in the circuit of Fig. 5, shown by way of example, in the following manner.

The positive photo-electric cell 65 is connected in a series circuit composed of the battery 85, and a resistance 86. Similarly, the negative photo-electric cell 66 is connected in series with a battery 87 and a resistance 88. These two circuits are connected at the point 89. The RI drop across the resistance 86 is thus proportional to the amount of light falling on the photo-electric cell 65, and, similarly, the RI drop across the resistance 88 is proportional to the amount of light falling on the photo-electric cell 66. As the two circuits just described are connected in reverse direction, the net RI drop across the resistance composed of resistances 86 and 88 in series is proportional to the difference between the amounts of light falling on the two cells 65 and 66 and has a direction depending upon which of the two photo-electric cells 65 or 66 receives the greater amount of light. This net RI drop is utilized to control the plate circuit current of the thermionic valve 91.

Accordingly, the resistance 86 is connected to the grid of the thermionic valve 91, and the resistance 88 to the filament thereof. A "C" battery 92 is inserted in the grid-filament circuit of the thermionic valve to insure its operation at about the center of the straight line portion of its characteristic curve, so that the plate circuit current is linearly dependent upon the potential impressed on the grid-filament circuit.

A battery and rheostat indicated at 93 and 94 respectively provide and control the heating of the filament of the thermionic valve 91.

A "B" battery 95 is connected in series with a resistance 96, the battery being connected to the filament of the thermionic valve 91, and the resistance being connected to the plate of the thermionic valve 91. The battery 95 having a suitable voltage, the RI drop across the resistance 96 is linearly dependent upon the RI drop impressed upon the grid-filament circuit of the thermionic valve 91. The setting of the rheostat 94 and the voltages of the batteries 92 and 95 are adjusted to secure linear operation of the thermionic valve 91.

The thermionic valve 97 is resistance coupled to the thermionic valve 91, so that its output is linearly dependent upon the output of thermionic valve 91. The purpose of thermionic valve 97 is to amplify the output of thermionic valve 91. The amplification, however, may be greater or less than that shown in Fig. 5, where two stages of amplification are shown by way of example.

The plate circuit current of thermionic valve 97 is carried by leads 81 and 82 to the radio transmitter and controls the modulation of the carrier wave thereof.

Referring now particularly to Fig. 4, and to the manner in which the optical density varies from place to place on the analyzing screen, the purpose of the analyzing screen is to resolve the varying illumination along the narrow strips of light which are to pass through the slits, into harmonic components, and to cause each of those components to oscillate at a distinct low (audio) frequency. This resolution into harmonic components may be accomplished according to a large number of formulæ, using the properties of orthogonal functions, of which the zonal harmonic series and the Fourier series are well-known examples. In the present embodiment of the invention, where a vibrating ribbon is employed at the receiver's station, as hereinafter described, the resolution into harmonic components is accomplished according to the Fourier series.

Referring first to the positive portion 55 of the analyzing screen, Fig. 4 shows in perspective a diagrammatic outline thereof. A point 101 is selected on one edge of the screen to serve as the origin of coordinates. The axis of X runs from the origin 101 along the cylindrical surface parallel to the axis thereof. Also, from the origin 101 the axis of Y runs circumferentially around the cylinder in a plane at right angles to its axis. The position of any point 102 on the cylindrical band then determines uniquely corresponding values of the coordinates $x$ and $y$, as indicated in the figure. The axial length of the band is denoted by A, and the curvilinear distance about its circumference by B. The words "transmissivity at a portion of the screen" are hereinafter used to denote the proportion of light transmitted through that portion of the screen to the amount of light incident on the screen. For example, if a unit amount of light falls on a portion of the screen, and two-thirds of that amount is transmitted by the screen, the transmissivity will be two-thirds; and if a portion of the screen transmits no light, that portion of the screen will be of zero transmissivity. With a screen constructed to deal with $n$ harmonics, the transmissivity at a point whose coordinates are $x$, $y$, is given by the following formula, in which $T$ indicates the transmissivity, and $k$ is a predetermined constant selected for convenience in design, and equals twice the number of complete configurations desired to extend about the circumference of the screen:

*Formula I*

$$T = \sin \pi\frac{x}{a} \cos \pi k\frac{y}{b} + \sin 2\pi\frac{x}{a} \cos 2\pi k\frac{y}{b} + \sin 3\pi\frac{x}{a} \cos 3\pi k\frac{y}{b} + --- + \sin n\pi\frac{x}{a} \cos n\pi k\frac{y}{b}.$$

When the value of T for any point of the positive band 55 of the screen, as given by Formula I, is either zero or negative, at that point the screen is constructed substantially completely opaque, so that no light whatever is transmitted by that point of the screen. The screen is so constructed that the transmissivity at other points thereon is proportional to T, the maximum transmissivity being regarded as unity.

The negative portion or band 56 of the analyzing screen is similarly constructed, but with the following differences. When the value of T, as given by Formula I, is zero or positive for any point, that point is made substantially completely opaque, while for any other point, for which the value of T is negative, the transmissivity is made proportional to the numerical value of T.

One convenient method of constructing the positive and negative bands of the analyzing screen is to form them of photographic emulsion so exposed to light that, on development and fixing, the transmissivity of each point on the emulsion will be in accordance with the foregoing description. A rectangular white surface representing a development of each band may be divided into small equal squares, and each square, according to its position, is left entirely white or completely blackened or ruled with black lines so as to present from a distance a grayish appearance, the degree depending upon Formula I, so that when the prepared rectangle is photographed and the negative developed and fixed, the transmissivity of the negative will be substantially in accordance with Formula I, and it may be wrapped around the translucent drum 50 to form one band of the analyzing screen, the other band being similarly prepared from another white surface.

For a selected photographic emulsion subjected to a selected development and fixing after being exposed for a selected length of time, the transmissivity resulting from exposure by a selected camera and lens to different degrees of grayness of a prepared white surface at a selected distance, the surface being uniformly illuminated to a selected intensity, may be first experimentally determined, using a photo-electric cell such as is employed in the converting apparatus at the sending station, by usual photometric methods, and the data so obtained used in conjunction with Formula I to construct a prepared white surface for each band, positive and negative, of the analyzing screen.

Referring now particularly to Figs. 6, 6A, 6B, and to the converting apparatus at the receiving station there shown, a box or casing 125 has mounted in the bottom thereof a lamp 126, which is preferably at least as long as the ribbon slit hereinafter described, and is lighted from any suitable source and to any suitable or desired intensity; or in place of the lamp 126 an arc light or other means of illumination may be used, the light from which is spread out to cover the slit by a lens or parabolic mirror.

A shield 127 is provided with a ribbon slit 128 which in the present instance extends horizontally. Light from the lamp 126 is directed towards the ribbon slit 128 by a diffuse reflector 129. A mirror 130 reflects the light coming through the slit upwardly through a lens 131 supported in a lens housing carried by the casing 125. The light passing through this lens is reflected from one of the mirrors 133 to a screen 134, which may be either opaque or translucent. The mirrors 133 are mounted circumferentially about a revolving mirror drum 135 mounted on a shaft 136 which is driven through a reduction gear 137 by a motor 138. The stator of the motor 138 is mounted in bearings 140 so that it may be rotated by means of the handle 141 for a purpose hereinafter referred to.

The foregoing construction causes an image of the ribbon slit 128 formed by the lens 131 with the aid of the fixed mirror 130 to be directed upon the screen 134 by each of the revolving mirrors 133. The image of the slit is focused on the screen, and is caused to traverse it from one end to the other by the rotation of the mirror drum 135. The mirrors 133 are so arranged about the mirror drum that when one slit image reaches the end of the screen, another starts across it. The mirror drum 135 preferably has the same number of mirrors and runs at the same speed as the mirror drum 40 of the converting apparatus at the sending station. This can be accomplished by manual control of the speed of the motor 138; or, especially where the pictures are transmitted by wire, by running the two motors 25 and 138 as synchronous motors from a common generator; or by any sufficiently accurate synchronizing method known in the art, such as by utilizing an audio frequency channel separate from those transmitting the harmonic components of the picture but transmitted over the same carrier wave, this audio frequency being used to control the speed of both motors 25 and 138.

The handle 141 of the motor 138 is used to frame the pictures on the screen 134.

Adjacent the ribbon slit 128 and extending therealong is a ribbon 150 whose width is the same as the slit 128. The ribbon is anchored at one end in a fixed anchor lug 151, and at its other end passes through a slot 152, the ribbon fitting snugly in the slot. The end of the ribbon extending beyond the slot 152 has fastened thereto one end of a coil spring 153 whose other end encircles the head of a screw 154 which is adjustable in the fixed lug 155 by rotating the knurled nut 156. By this means the tension of the ribbon 150 may be regulated, in order to vary the natural frequency of vibration of the ribbon 150. In practice, the slot 128 is made nearly as long as the effective length of the ribbon 150, though it has been shown considerably shorter in the drawings for clearness of illustration.

When the ribbon is stationary, no light can pass through the slit 128.

A fixed magnet 158, whose strength may be electromagnetically augmented, is so disposed as to place the ribbon 150 in a uniform magnetic field perpendicular to the length and width of the ribbon, so that when a current flows in the ribbon, an electromagnetic force is thereby exerted on the ribbon tending to move it to one side and thus permit the passage of light through the slot. In practice, the poles of the magnet 158 are closer together than indicated in Fig. 6, where they have been shown considerably separated for clearness of illustration.

The lamp 126 and the magnet coil 159 are energized from any suitable source of constant potential, though the lamp 126 may be energized from a source of alternating current, providing it is so constructed (as by having a high thermal capacity) that it constitutes a light source of virtually constant intensity.

The diffuse mirror 129, reflecting mirror 130 and shield 127 are of non-magnetic materials. The ribbon 150 is preferably of non-magnetic material, but must be of conducting material.

An ordinary radio receiving set is indicated diagrammatically at 164, the output leads 165 and 166 of which are connected to a distributor 162. In the distributor 162, the detailed circuits of which are exemplified in Fig. 6A, the output of radio receiving set 164 is distributed to a plurality of circuits, and conducted thence by cable 163, to act upon ribbon 150. As shown in Fig. 6B, by way of example, the wires of cable 163 terminate upon ribbon 150, being connected thereto electrically by some such means as soldering or welding or by, say, a small roller, each wire being secured at a different position along the length of the ribbon 150 in accordance with the arrangement hereinafter discussed in connection with Fig. 6A. The cable 163 is so placed and the wires tips are so led and connected to ribbon 150 as to offer virtually no obstruction to the illumination of slit 128 by lamp 126 and diffuse reflector 129, and as to offer a minimum negligible interference with the motions of the ribbon (exemplified by the curl of the wire tip in Fig. 6B).

Referring now particularly to Fig. 6A, which is primarily a schematic diagram of the distributer 162, we note: the leads 165, 166 which bring to the distributer 162 the output of radio receiving set 164; the ribbon 150 supported in the lugs 151, 152; and the cable 163.

Following my usual example, the distributer is arranged for the case in which the analysis is made to include 6 harmonics, but its extension to a larger number of harmonics will be obvious. The leads 165, 166 are connected to six parallel circuits, one for each harmonic. For example, the circuit for the first harmonic (fundamental) consists of an inductance $L_1$, a capacity $C_1$, a resistance $R_1$, and the primary of a transformer $M_1$, all in series across the leads 165, 166, the secondary of $M_1$ being connected to wires of cable 163 through resistances $R_{11}$ and $R_{12}$. The function of inductance $L_1$ and capacity $C_1$ is to constitute a band-pass filter so that $M_1$ will be energized substantially only by the (modulated) first harmonic frequency. This construction of a band-pass filter is extremely simple and was chosen as an illustration so as not to complicate the diagram. Actually, a more complex band-pass filter of more effective design as well-known in the art would be preferable, and so $L_1$, $C_1$ may be understood as symbolic for such a filter. The function of $R_1$, in conjunction with $R_2$, $R_3$, etc., is to adjust the relative amplitude of the first harmonic as a whole; it can be dispensed with and its function devolved upon $R_{11}$, $R_{12}$. The function of transformer $M_1$ is to avoid false circuits between leads 165, 166 and ribbon 150 by interrupting the metallic continuity. The function of resistances $R_{11}$, $R_{12}$ is better seen in connection with a higher harmonic. The inductance $L_1$ and the transformer $M_1$ have been drawn as having cores of iron, permalloy (and the core will be preferably laminated or pulverized, etc.), etc., but they may have cores of air, etc.

The circuits for the remaining harmonics are similar, the manner of connecting to the wires of cable 163 being as shown. Due to the manner of connecting, it results that the first harmonic passes through the whole ribbon (effective length between lugs 151, 152), the second harmonic enters the ribbon in two halves in opposite directions, the third harmonic enters the ribbon in three thirds in alternate directions, and so on for the higher harmonics. The wires of cable 163 are joined to ribbon 150 at such points as to divide its effective length into halves, thirds, fourths, etc. The function of the resistances such as $R_{21}$, $R_{22}$, $R_{23}$, etc., is to equalize the resistances of the various paths through the ribbon so that the currents will be symmetrically distributed.

The purpose of this distribution of the output from leads 165, 166 into a plurality of paths through ribbon 150 is to cause each harmonic frequency to set up in the ribbon forces (due to the uniform magnetic field in which the ribbon lies) tending to cause the ribbon to oscillate mechanically in the mode corresponding to that harmonic. Thus, the first harmonic which passes through the entire effective length of the ribbon in one circuit will tend to cause the ribbon to vibrate in its fundamental mode (single loop), while the second harmonic which passes through the ribbon by two paths in opposite senses will tend to cause it to vibrate in the second harmonic mode (two loops), and so on for each harmonic. The connections are so ordered as to preserve the correct phase relations between harmonics.

The ribbon supports are insulated so that the output from the distributer 162 is not shunted through any other part of the converting apparatus at the receiver's station, but must pass wholly through the ribbon 150.

When the output from the radio receiving set 164, amplified if desired, which corresponds to the input to the radio sending set 80, passes through the distributer 162 and thence through the ribbon 150, the lamp 126 being lighted and the drum 135 rotating in synchronism with the drum 40, the image of the object 72 will be reproduced on the screen 134.

The two drums 40 and 135 preferably have the same number of mirrors and rotate synchronously, though either is absolutely necessary, the essential feature being that the same number of mirrors pass a fixed point adjacent the drum's periphery per second.

Damping means in addition to the magnetic field may be employed, as by filling the casing 125 with compressed gas or transparent liquid, such as castor oil or kerosene.

The manner of operation of the invention is as follows:

The problem of transmitting the image of the object 72 to the screen 134 is first reduced to that of transmitting the image of a narrow strip thereof by means of the synchronous mirrors 42 and 133. The strip image to be transmitted is impressed upon the photo-electric cells 65 and 66 in duplicate after modification by the two bands 55 and 56 of the analyzing screen. These two bands or screens are so constructed that the light summed up on the two photo-electric cells 65 and 66 causes a net drop across the joint resistances 86 and 88 consisting of a plurality of audio frequencies, the amplitudes and signs (i. e., phase relations) of which represent the harmonic components of the strip image which is resolved according to a Fourier series of $n$ terms. This plurality of audio frequency oscillations co-existing in the joint resistance 86, 88, is used to modulate linearly the radio frequency of the radio transmitter 89. The radio transmission having been received by the radio receiving set 164, the output of the receiving set substantially corresponds linearly to the oscillations in the joint resistances 86, 88, and is imposed through the distributer 162 upon the ribbon 150.

The ribbon 150, which lies in a uniform magnetic field, is subjected to transverse forces due to the oscillating currents. The fundamental natural frequency of the ribbon is adjusted by varying its tension to equal the fundamental frequency existing in the joint resistances 86, 88, which frequency is that at which the fundamental component of the strip picture alternates. The amplitude with which the ribbon 150 performs its fundamental vibration is, then, proportional to the fundamental harmonic component of the strip image, and the same is true of the remaining harmonics of the ribbon and the strip image, the correct phase relations being automatically preserved.

Consequently, the amplitude of vibration of any point along the ribbon is proportionate to the intensity of illumination of the corresponding point along the strip image. As the amount of light passed through the slit 128 at any point depends only upon the amplitude with which the ribbon vibrates at that point (the light intensity from the lamp being constant and uniformly spread along the slit) the illumination passed through the slit reproduces the strip image.

Referring now to Figs. 7 to 9 inclusive, there is shown a modified form of the converting apparatus at the receiving station. These figures should be viewed in conjunction with Fig. 6, to which the modification applies. Fig. 7 is a side elevation, Fig. 8 an end elevation partly in section, and Fig. 9 a top elevation of apparatus to be substituted for part of that shown in Fig. 6.

The essential difference between the construction depicted in Fig. 6 and that modified according to Figs. 7, 8 and 9 is that instead of employing a diffuse reflector 129 and a mirror 130 to convey the light from the lamp 126 through the slit 128 (as controlled by the ribbon 150), the magnet furnishing the field for the slit-controlling ribbon is so constructed that the pole pieces are perforated to form the slit so that the light may be passed directly without recourse to reflectors.

In Figs. 7, 8 and 9, part 170 is a permanent magnet the strength of which may be augmented by the coil 171 or the magnetic flux may be provided entirely by this coil. The pole pieces are pierced by the slits 175, 176.

When the apparatus is at rest light is prevented from passing through the magnet by the ribbon 180, which plays the same role as ribbon 150 of Fig. 6 and is similarly mounted and controlled. One end of ribbon 180 is secured to fixed lug 181 and the other end passes snugly through slotted lug 182. Similarly to the form previously described, the tension of ribbon 180 is adjustable by means of spring 185, bolt 186, and nut 187 in conjunction with fixed lug 188.

As in the form of Fig. 6, the current from the radio receiving set 164 is passed through distributor 162 and then through ribbon 180, which is so insulated that the current will not be shunted through any other part of the apparatus. When current is flowing in ribbon 180, it is subject to transverse magnetic forces and on moving to one side permits light from lamp 126 to pass.

This form of light valve is to be substituted for that shown in Fig. 6 to consist principally of magnet 158, magnet coil 159, diffuse reflector 129, slit 128 in shield 127, ribbon 150 with its mountings and adjustments, and mirror 130. The casing 125, lens 131, cable 163 and external parts will be the same.

In the actual construction the effective length of ribbon 180 between the lugs 181 and 182 will not be much greater than the length of the slits 175 and 176.

The width of ribbon 180 is the same as the width of slits 175, 176, or either or both of these perforations of the pole pieces can be wider than the ribbon 180 provided the equivalent effect is secured by a mask or shield slitted the same width as the ribbon. However, as it is desired that the ribbon 180 should always lie in as uniform a magnetic field as possible, the slits 175, 176 will preferably be made narrow, especially in comparison to the distance between pole faces.

In either form of light valve the ribbon current can be held constant and the fluctuating current from the radio set fed through the coil around the magnet which is then made preferably of laminated soft iron or permalloy. The same effect will be secured, but due to the hysteresis and induction effects, this procedure may not be preferred.

In order to follow this form, the windings of the magnets 158 or 170 will be modified, the same arrangement being used for either, so that only one need be described, say that for 158.

Referring to Figs. 6C and 6D, Fig. 6C shows the appearance on a fragment of magnet 158 of the winding substituted for winding 159 of Fig. 6. For the example of six harmonics, it consists of six electrically separate parts, numbered 159–1, 159–2, etc. The turns of winding 159–1 pass completely around the magnet, those for 159–2 reverse direction in the center by passing between the center laminations, those for 159–3 twice pass between the laminations, at the one-third and two-third points so that they alternate in sense, and so on for the higher harmonics. A single turn, for clarity, is shown in Fig. 6D with the laminations in section, for windings 159–1, 159–2, 159–3 and the others proceed in the same manner.

The terminals of winding 159–1 are connected in place of the primary of transformer $M_1$ and $M_1$, $R_{11}$, $R_{12}$ and cable 163 are eliminated from the distributer. Similarly, winding 159–2 is connected in place of $M_2$ and $M_2$, $R_{21}$, $R_{22}$, $R_{23}$ are eliminated and so on for the higher harmonics.

The laminations of 158 in this form may be spaced, as by paper spacers, to increase the cross-reluctance and so increase the proportion of flux set up by the windings which crosses from pole-piece to pole-piece to that which leaks across laminations. In the case of a magnet of the form of Figs. 7, 8 and 9, the laminations will be so formed as to have equal reluctances, by having the same length of iron (permalloy) path for each (this is obviously true for 158). The laminations in each form extend up to, and constitute, the pole-faces.

The configuration of the flux acting on the constant-current ribbon will be such, due to the foregoing construction, that the forces set up in the ribbon will be substantially the same as those caused in the first form of the receiver, and so the operation will be mechanically the same.

Referring to Figs. 1, 2 and 10, there is shown a modification of the converting apparatus at the transmitting station. Instead of scanning the object whose image is to be transmitted by means of rotating mirrors 42, a rotating slit drum 85 (Fig. 10) is used which is mounted in bearings 23 co-axially with drum 50 and surrounding it, the hollow journal 87 surrounding the journal of shaft 24. Journal 87 is fitted with worm gear 88, by which it is rotated by motor 25 at a lower speed than drum 50.

Slit drum 85 fits closely but freely around translucent drum 50, i. e., there is a slight clearance between them. Slits 90 in drum 85 then perform the functions of mirrors 42 and slits 61 and 62, slits 61 and 62 being widened to include the whole image on the analyzing bands 55 and 56, and mirrors 42 with their mounting and drive omitted.

Slits 90 are spaced apart the circumferential length of the images on the bands 55, 56, and as they sweep by the lenses 48, 49 scan the image line-by-line.

Using the drum 85 in lieu of mirrors 42, then at the receiving station the number of mirror passages per unit time is made the same as the number of slit passages per unit time at the transmitting station.

Referring now to Figs. 11 to 17 inclusive, a modified form of apparatus at the sending station is shown in which the analyzing of a strip of the image to be transmitted into harmonic components and the impression of the magnitudes of the several harmonic components to control the amplitudes of the audio frequency components of the carrier oscillation is effected in two steps.

Figure 16:
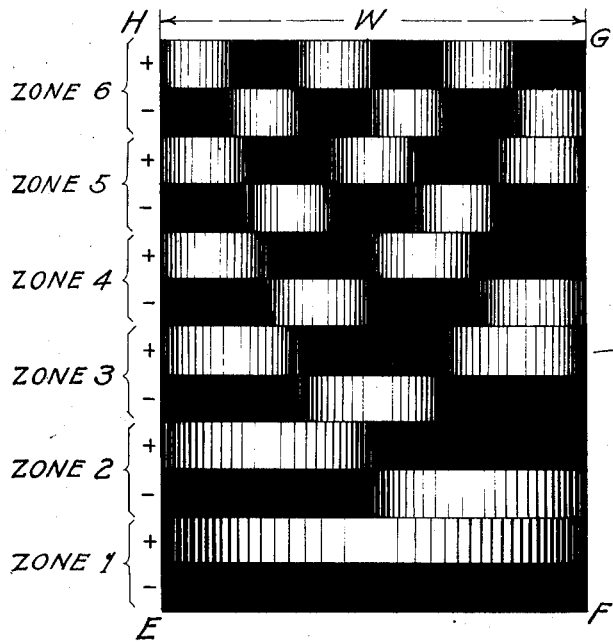
Fig. 16 is a plan view of the analyzing screen 240.

The strip to be transmitted, in virtual multiplicate, illuminates the several zones of a fixed rectangular analyzing screen (shown in Fig. 16). The light transmitted by the analyzing screen is optically assembled or gathered into a taenoid image which illuminates a radial portion of a moving oscillator screen (shown in Fig. 17). The light transmitted by the oscillator screen is separated into two portions, each of which controls the action of a photo-electric cell. These two cells are connected as shown in Fig. 5 and perform the same function as the two photo-electric cells 65 and 66 already described.

Referring to Figs. 11, 12 and 13, the principal part of the converting apparatus is shown. Fig. 11 is a top plan with cover removed. Fig. 13 is a side elevation with parts broken away and Fig. 12 is a sectional view, section along line XX of Fig. 13 looking in direction of arrows XX.

Base 201 supports bracket 203, which terminates in bearings 205 and 206. Rotatably mounted in bearings 205 and 206 is mirror carrier 210, which is rotated by constant speed motor 215 through reduction gearing 216 and associated shafting and gearing. Peripherally mounted on carrier 210 are a plurality of rectangular mirrors 230 which successively reflect light as indicated by broken lines 232 from the object whose image is to be transmitted upon the lens or lens combination 235, preferably sphero-cylindrical. The lens 235 forms an image (whose character is elsewhere described) upon the fixed rectangular analyzing screen 240.

Light passed by the analyzing screen 240 is received by the sphero-cylindrical lens or lens combination 245, which forms a taenoid image (whose character is elsewhere described) upon a portion of the rotating disc 248. This disc 248 is also driven from the reduction gearing 216 by associated shafting and gearing, its shaft 218 being bearinged in bracket 219.

A concentric portion of the disc 248 carries the oscillator screen 250. Light passed by the oscillator screen 250 is divided by the separator 255 so as to fall partly on each of the photo-electric cells 261 and 262, assisted, if so desired, by lenses or equivalent means 265 and 266. The essential thing is that each portion of the taenoid image as modified by the oscillator screen should be equitably represented on one of the photo-electric cells 261, 262 as determined by the separator 255.

Appropriate light shielding is shown.

Referring now to Fig. 14, there is shown schematically in perspective the general principles of the device.

An object whose image is to be transmitted is represented by 270. Light from object 270, as indicated by broken lines 272, falls upon mirrors 230 in succession and thence to lens 235. As preferred, lens 235 is sphero-cylindrical and so tends to form an elongated image ABCD (as indicated by the broken rectangle) of the object 270. However, only a portion of this potential image is utilized, namely EFGH coinciding with the analyzing screen 240. In the actual apparatus the ratio of length AD to the length EH will be greater than can be conveniently shown in the drawing; in other words, the potential image ABCD is relatively long compared to the portion EFGH utilized. Thus the portion EFGH is virtually a strip image which has been drawn out in width and hence the illumination on the analyzing screen 240 will be sensibly uniform along lines parallel to EH while varying along lines parallel to EF according to the appearance of object 270, this effect being promoted by the cylindrical aspect of lens 235 in the preferred form of this lens. What is sought by this construction is the substantial duplication of the illumination of each of the divisions of the analyzing screen 240, the analyzing screen 240 being divided into zones as indicated in Fig. 14 and more fully described and depicted elsewhere.

Light passed by the analyzing screen 240 is formed, by the sphero-cylindrical lens 245 into a taenoid image upon the oscillator screen 250. This taenoid image extends between M and N, i. e., radially between the inner and outer circumferences of the oscillator screen 250. This taenoid image represents the light passed by the analyzing screen contracted in the direction EF, i. e. so that the line EH is drawn towards the line FG.

Light passed by the oscillator screen 250 is divided by the separator 255 to fall upon the photo-electric cells 261 and 262 as aided by the lenses 265 and 266.

Fig. 15 is an enlarged perspective fragmentary view of the separator 255. This separator 255 may be formed of thin sheet metal or similar material, blackened so that it will not set up any undesired reflections. It is folded or crimped approximately to the shape shown so that light from alternate segments of the taenoid image as passed by the oscillator screen 250 will be prevented from reaching one of the photo-electric cells 261 and 262, but will be afforded free access to the other. It is to be noted that the end pockets are only half as long in the direction MN as those between, for a reason to be explained later. Other forms of separator are practicable, as by alternately directed mirrors or prisms, the essential function being that of dividing the light to reach only the appropriate photo-electric cell.

Fig. 16 is a plan of the analyzing screen 240. It is formed on a translucent plate by means similar to those already described in connection with the first form of transmitting converter. It is divided into zones. For purposes of illustration, six zones have been determined upon, although in an actual apparatus the number will be much larger according to convenience of design. Each zone is subdivided into a positive and negative sub-zone of equal size as shown. In the direction EH the optical density is uniform in each sub-zone, but in the direction EF it varies as hereinafter described. Fig. 16 is an attempt to give in a simple drawing an approximate idea of the appearance of the analyzing screen 240. Completely blackened areas indicate virtually complete opacity. Shaded areas indicate varying transmissivity, the heavy shading representing low transmissivity, and the white areas high transmissivity. The center of each area of variable transmissivity is of maximum transmissivity which is taken as unit transmissivity. The transmissivity of each zone is regulated according to Formula II:

$$T = \sin m\pi \frac{z}{W}$$

Where T is the transmissivity, $m$ is the number of the zone, W is the width of the analyzing screen 240 and $z$ is the distance from the left margin EH. When the value of T as obtained from Formula II is opposite in sign to that of the sub-zone, the transmissivity at that point is made zero (portions shown in black); when the sign is the same as that of the sub-zone, the transmissivity is made proportional to the numerical value of T.

Figure 17:
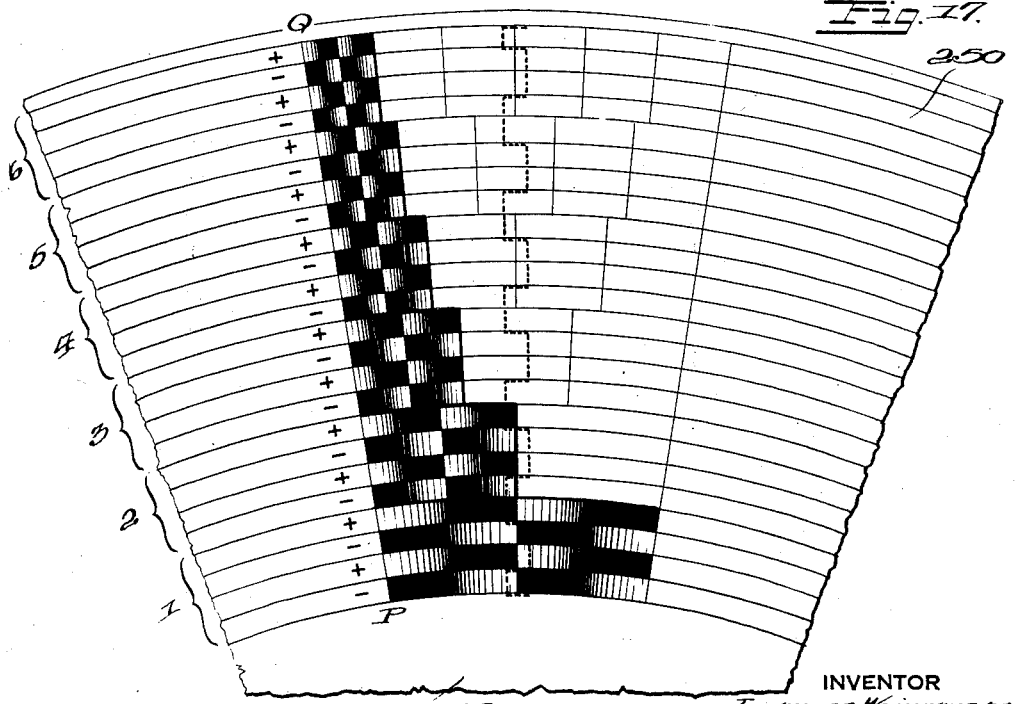
Fig. 17 is a fragmentary plan view of disc 248 carrying a partly completed portion of oscillator screen 250.

Referring now to Fig. 17, a fragmentary plan of disc 248 is shown, carrying a partly completed portion of oscillator screen 250. It is to be noted that a disc has been used for purposes of illustration, whereas a cylinder or equivalent means can be utilized. The disc 248 is of translucent material and the oscillator screen 250 may be formed similarly to previous description. As there are six zones in the analyzing screen 240, there are six bands to the oscillator screen. Each band is divided into four sub-bands. Thus there are twenty-four equal sub-bands shown. These are designated alternately positive and negative as shown. The bands are numbered in the same order as the zones of the analyzing screen. When disc form is used it is advantageous to have the $$T = \cos \pi kv$$

lower numbered bands towards the center, so that the radial expansion will alleviate the congestion of the higher numbered zones.

A radial origin line PQ is selected and the transmissivity varied according to Formula III: in which T is the transmissivity; $m$ is the band number; $k$ is a predetermined constant, selected for convenience in design, and equal to twice the number of complete configurations desired to extend about the screen; and $v$ is the proportion of the circumference from origin line PQ of the point whose transmissivity is to be determined. The procedure is quite similar to that described for the analyzing screen 240.

Light passing through a positive portion of the analyzing screen and a positive portion of the oscillator screen is caused by the separator to fall only on the positive photo-cell 262; and, similarly, light which passes through negative portions of both screens is caused by the separator to fall on the positive photo-cell. Conversely, light which passes through a positive portion of one screen and a negative portion of the other is caused by the separator to fall only on the negative photo-cell 261.

The operation of the apparatus just described is as follows:

The problem of transmitting an image of the object 270 to the screen 134 is first reduced to that of transmitting the image of a narrow strip thereof by means of the synchronous mirrors 230 and 133. A strip image to be transmitted is by virtue of the lens 235 produced in virtual multiplicate upon the several zones of the analyzing screen 240, the image formed on each zone being substantially the same as that formed on any other. The difference between the total amount of light transmitted by the positive sub-zone of any zone and the total amount of light transmitted by the negative sub-zone is proportional to the amplitude of the corresponding harmonic component of the strip image, and is positive or negative according to which sub-zone predominates.

The total light transmitted by each sub-zone of the analyzing screen 240 is by virtue of lens 245 concentrated upon the corresponding sub-bands of the oscillator screen 250 as a portion of the taenoid image. As for each zone of the analyzing screen there are two sub-zones and for each band of the oscillator screen there are four sub-bands, it will be seen that to each sub-zone of the analyzing screen correspond two sub-bands of the oscillator screen, one plus and one minus.

The effect of the moving oscillator screen is to cause the light transmitted by each zone of the analyzing screen to oscillate in value and sign, according to a cosine law. All the light transmitted through both the analyzing screen and the oscillator screen being sorted according to sign by the separator to control the corresponding photo-cell, the result is that there is set up in the joint resistances 86 and 88 a net drop which fluctuates as a plurality of audio frequencies the amplitudes and signs (i. e. phase relations) of which represent the harmonic components of the strip image which is resolved according to a Fourier series of $n$ terms.

From this point on, the operation is similar to that already described.

Figure 18:
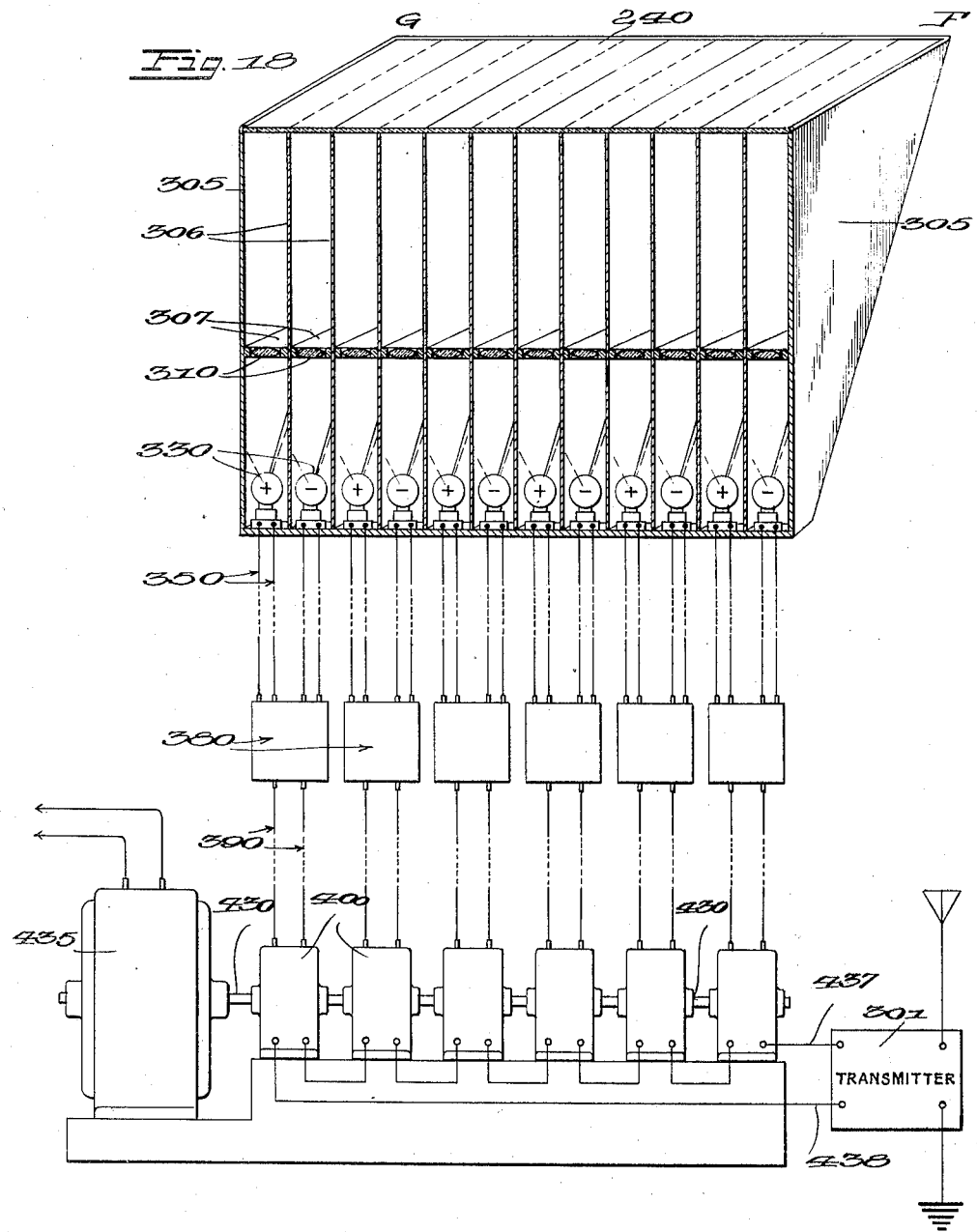
Fig. 18 is a view, partly in perspective and in section, of the apparatus from the analyzing screen 240 to the radio transmitting set 301.

A further modification is set forth in Figs. 18 and 19. The apparatus is the same down to the analyzing screen 240 of Fig. 12, etc.

Figure 19:
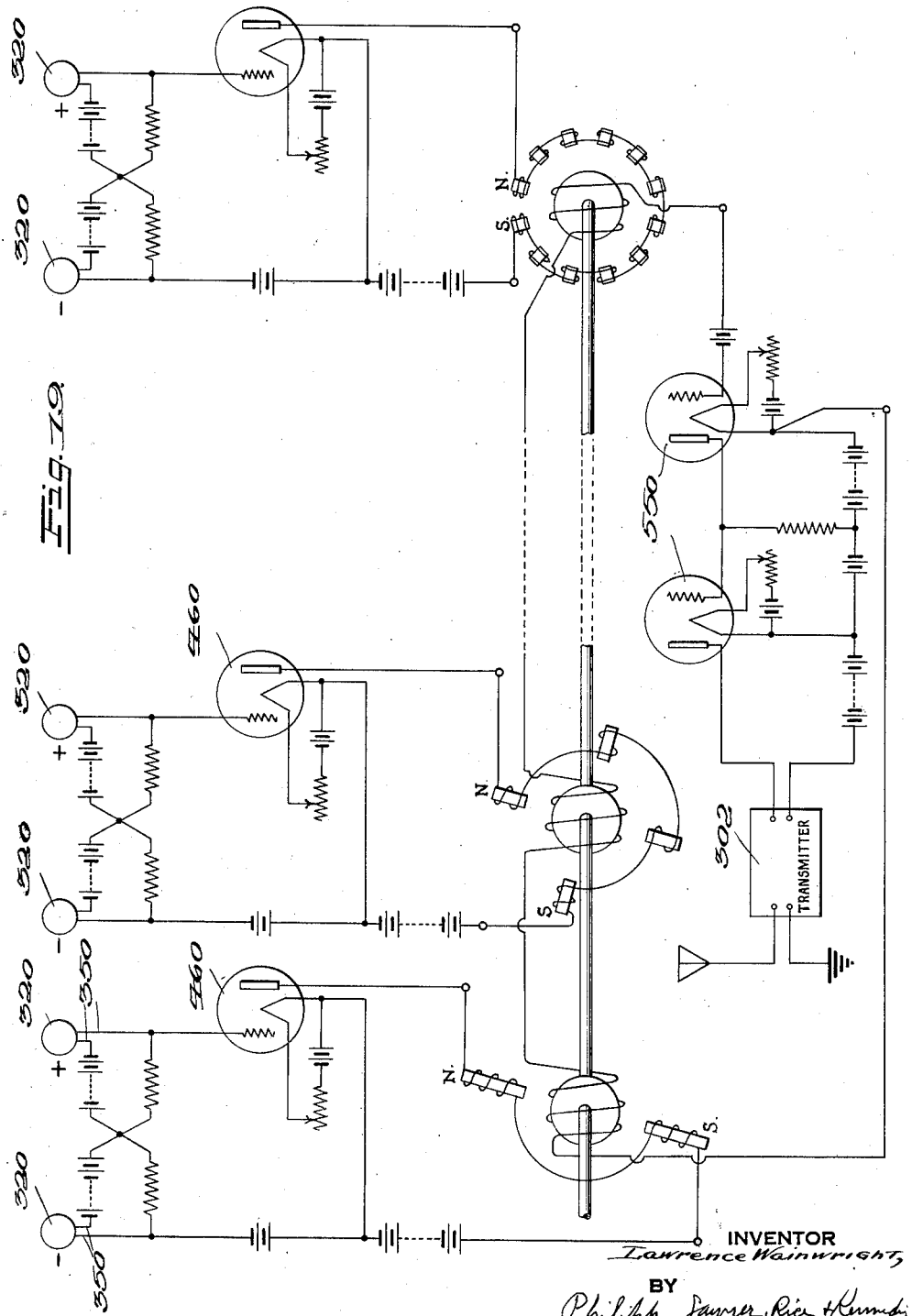
Fig. 19 is a wiring diagram of the apparatus shown in Fig. 18.

Fig. 18 is a view of the remainder of the apparatus from the analyzing screen 240 to the radio transmitting set 301. It is partly in perspective and in section. Fig. 19 is a wiring diagram of the apparatus shown in Fig. 18.

The distinguishing feature of this modification is that the oscillations of the harmonic components are accomplished electrically rather than optically as in the previously described forms.

The analyzing screen 240 is mounted in a casing 305, each sub-zone being partitioned off by partitions 306 and provided with an individual photo-cell 330, which, as previously discussed, may be assisted by lenses 310 in partitions 307, or the photo-cells may have an especially adapted elongated shape. Each photo-cell is connected by leads 350 to a combining and amplifying apparatus 380. There are half as many of these combining and amplifying apparatuses 380 as there are photo-cells, as the two cells (positive and negative) of a zone are connected to the same combining and amplifying apparatus. Each combining and amplifying apparatus is connected by leads 390 to its respective generator 400. These generators are driven together on the same shaft 430 by the constant speed motor 435 and have their armatures connected in series by leads 437 and 438 to the conventional radio transmitter 301.

Referring particularly to Fig. 19, which is a wiring diagram of the apparatus shown in Fig. 18, it will be seen that the pairs of cells 320 are connected similarly to those shown in Fig. 5 with the exceptions that only one stage of amplification (by valves 460) is given by way of example, although it might be more or less, and the output is led through the field of the corresponding generator.

As shown by way of illustration, the generator for each zone has twice as many poles as the zone number: thus, two for the first zone, four for the second, and so on. Further, the number of turns of winding on each generator pole is inversely proportional to the number of the zone: thus on each pole of the first zone generator are $x$ turns, on each pole of the second zone generator are $x/2$ turns, on each pole of the third zone generator are $x/3$ turns, and so on.

Each pole of the generators consists not only of the winding just referred to, but includes a means for neutralizing part of the flux set up by this winding, for a reason to be hereinafter explained. By way of illustration this means consists of a permanent magnet whose flux strength (as roughly indicated in Fig. 19 by its length) is made proportional to the number of turns in its associated winding. Thus the magnets of the first zone generator produce an effective neutralizing flux of strength $y$ per pole, while those of the second produce only $y/2$ per pole, and so on.

In Fig. 19 the conventional radio transmitter 301 of Fig. 18 has been drawn out as transmitter proper 302 and input amplifier consisting of valves 550 and usual associated apparatus (resistance coupling being shown by way of preference).

From the foregoing construction the following results are obtained. As explained in connection with Fig. 5, it results that the varying component of the output of valves 460 corresponds to the magnitude and sign of its respective harmonic component of the strip image. Hence the varying part of the flux set up by the field windings so correspond. The permanent magnets are so designed to neutralize that part of the flux of the windings due to the steady part of the output of valves 460. Thus the net field flux of each generator corresponds to its respective harmonic component of the strip image. The number of poles being increased in proportion to the zone number means the frequencies are so increased, and the pole strengths (winding and permanent magnet) are decreased inversely to retain the same voltage in each armature for the same output of valves 460.

Thus the voltage set up in each armature (all armatures have the same number of turns, and voltage is proportional to field strength, armature turns, and speed of rotation) is proportional to the corresponding harmonic component of the strip image, and the correct frequency and phase relations are obtained. These voltages are added up by the series connecting of the armatures, and so the input to the radio transmitter is the same as that provided by the previous forms of converting apparatus at the sending station.

Alternately, the results obtained by means of this plurality of generators might be obtained by thermionic valves and associated apparatus.

There are some obvious slight variations in the generator scheme. For example, the armatures can be stationary and the fields rotate, but these things are very well known in the electrical art.

What I claim is:

1. The method of transmitting visual images which comprises successively transmitting component lineally extended areas by effecting the instantaneous resolution of each lineally extended area into harmonic components each of which is derived from substantially the whole of said area at a transmitting station, simultaneously effecting the synthesis of those components at a receiving station, and repeating the above steps for each lineally extended area transmitted.

2. The method of transmitting visual images which comprises successively transmitting component lineal strips by effecting at a sending station the instantaneous resolution of each strip into a plurality of light value representations each of which is derived from the light values along the strip as a whole, simultaneously sending said representations to a receiving station, there effecting the synthesis of said representations, controlling the illumination along a strip by means of the synthesized representations, and repeating the above steps for each strip transmitted.

3. The method of transmitting visual images which comprises successively transmitting taenioid components by optically effecting at a sending station the instantaneous resolution of each component into a plurality of light value representations each consisting of the magnitude of an electric current and each of which is photoelectrically derived from the light values along the taenioid component as a whole, using these currents to control fluxes of energy to a receiving station, there simultaneously effecting the synthesis of said representations by combining said fluxes of energy, utilizing the synthesized representations to control illumination along a strip, and repeating the above steps for each strip transmitted.

4. The method of transmitting visual images which comprises successively transmitting taenioid components by optically resolving each component according to a sequence of orthogonal functions instantaneously into a plurality of light value representations each of which consists of the magnitude of an electric current and is photoelectrically derived from the light values along the taenioid component as a whole, using these currents to control fluxes of energy to a receiving station, there simultaneously effecting the synthesis of said representations by combining said fluxes of energy in superposition according to the same said sequence of orthogonal functions, using the synthesized representations to control illumination along a strip, and repeating the above steps for each taenioid component transmitted.

5. Image transmitting apparatus comprising means for scanning a view line by line, an analyzing screen for simultaneously analyzing the light of an entire line into harmonic components each of which is derived from substantially the whole of said line, means for projecting the line to be analyzed upon the screen, and light sensitive means responsive to said harmonic components for producing corresponding electrical components.

6. A television receiver comprising electrical means for receiving a plurality of harmonic frequencies, means for combining said frequencies to produce an electrical wave whose envelope is a composite thereof, means for simultaneously converting the composite wave into a line of light the illumination along whose length corresponds to the envelope of the electrical wave, and means for projecting a series of such lines of light in a plurality of parallel sequential positions upon a viewing screen.

LAWRENCE WAINWRIGHT.

Certificate of Correction

Patent No. 1,968,977. August 7, 1934.

LAWRENCE WAINWRIGHT

It is hereby certified that errors appear in the printed specification of the above numbered patent requiring correction as follows: Page 4, line 26, second line of formula 1, for "$\frac{y}{a}$" read $\frac{x}{a}$; page 8, after line 77, strike out the equation; and after line 84, insert the equation as shown below—

$$T = \cos m\pi k v$$

and that the said Letters Patent should be read with these corrections therein that the same may conform to the record of the case in the Patent Office.

Signed and sealed this 11th day of September, A. D. 1934.

[SEAL]

BRYAN M. BATTEY,
*Acting Commissioner of Patents.*